Jan. 5, 1954  F. F. TONE  2,664,795
PHOTOGRAPHIC FLASH LIGHTING AND SYNCHRONIZING SYSTEM
Filed April 29, 1950

INVENTOR.
FREDERICK F. TONE
BY
*B. Schlesinger*
ATTORNEY

Patented Jan. 5, 1954

2,664,795

UNITED STATES PATENT OFFICE 2,664,795

PHOTOGRAPHIC FLASH LIGHTING AND SYNCHRONIZING SYSTEM

Frederick F. Tone, Holley, N. Y., assignor to Graflex, Inc., Rochester, N. Y., a corporation of Delaware Application April 29, 1950, Serial No. 158,987

6 Claims. (Cl. 95—11.5)

The present invention relates to photographic flash lighting equipment and more particularly to an electrical circuit for synchronizing the opening of the shutter of a photographic camera with the light peak of the flash lamp.

In the conventional flash light circuit, the function of the dry battery is to supply the power required, upon closure of the switch. This power may be used to ignite the lamp, or to ignite the lamp and to trip the shutter. This arrangement is inefficient for a great deal of the battery energy is wasted.

For greater efficiency it has been proposed to incorporate an electrical capacitor in the flash light circuit and to use the battery to charge the capacitor. When the switch in such a circuit is tripped, the power from the capacitor ignites the lamp, and, if a shutter-operating solenoid is incorporated in the circuit, actuates the solenoid.

The battery-capacitor circuit has definite advantages; among them, improved operation at a reduced temperature, for the operation of this circuit depends upon battery voltage, not upon battery current. A further advantage is that with this circuit several lamps may be arranged in series, which insures greater synchronization of flash than is possible when the multiple lamps are connected in parallel as is required in the conventional system. The battery-capacitor circuit, as heretofore designed, however, has had the disadvantage that it cannot be used to operate an electromagnetic synchronizer in such way as to have the camera shutter open at the peak of flash of the lamp unless a special type of solenoid is used for operating the shutter, or unless a vibrator-coil actuated vibrator-reed is used to time the closing of the circuit to the solenoid.

A primary object of the present invention is to provide a power circuit of the battery-capacitor type which will not only permit synchronization of the opening of the shutter with the light peak of the flash lamp, but which will also be simpler than any battery-capacitor system heretofore provided for the purpose.

Another object of the invention is to provide a power circuit for igniting a flash lamp and actuating a shutter-operating solenoid in which the time of operation of the solenoid can be adjusted very easily to synchronize with the peak of light of any type flash lamp employed.

Another object of the invention is to provide a power circuit for igniting a flash lamp and actuating a shutter-operating solenoid in which the time of operation of a solenoid of any conventional type can readily be adjusted to synchronize with the peak of any conventional type flash lamp.

A further object of the invention is to provide a circuit for powering a flash lamp and a shutter-tripping mechanism in which a variable inductor is used to adjust the time of opening of the shutter to secure the desired synchronization of shutter opening with the light peak of the lamp.

Another object of the invention is to provide an electrical circuit for photographic flash equipment, especially for use with low-voltage batteries, which is of the battery capacitor type and which incorporates means for indicating when the circuit is charged and ready for use.

Another object of the invention is to provide an electrical circuit of the type described which is so constructed that leakage losses are prevented, even though the solenoid is left connected, when the flash bulb is out of the circuit or is burned out.

A still further object of the invention is to provide an improved type of variable inductor which is simple in construction, strong and durable, and which can very easily be adjusted precisely to a fine adjustment for control of operation of a mechanism such as the tripping mechanism of a shutter of a photographic camera.

Other objects of the invention will be apparent hereinafter from the specification and from the recital of the appended claims.

Figure 1:
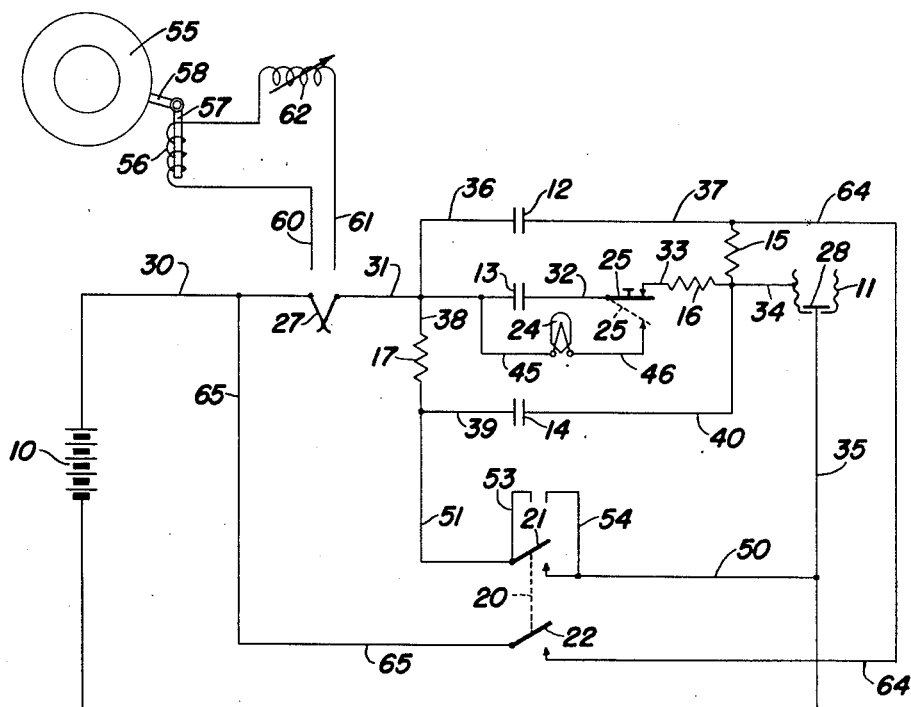
Fig. 1 is a diagram showing a power system constructed according to one embodiment of this invention for operating a flash lamp and the shutter-tripping mechanism of a photographic camera.

Reference will now be had to the drawing for a detailed description of the invention. 10 denotes a conventional battery, which is the power supply for the system, and which may be a "B" battery of approximately 30 volts capacity such as is conventionally used for a hearing aid. 11 denotes the socket for the flash bulb. 12, 13 and 14 designate, respectively, three capacitors. The capacitors 12 and 14 may be approximately 200 microfarad capacitors, while the capacitor 13 may be approximately a 100 microfarad capacitor. 15, 16 and 17 denote three resistors, which may be of approximately 2,000 ohms resistance each. 20 denotes a double-bladed firing switch, whose blades are denoted at 21 and 22, respectively. 24 designates a signal lamp; and 25 designates the switch for operating this lamp. 26 is the contactor in the bottom of the socket 11 for the flash light bulb.

27 denotes a conventional outlet which is self-shorting when the outlet plug is removed. If the shutter mechanism of the camera, on which the present invention is employed, is solenoid-operated, then the plug of the line, which is connected to the solenoid, is plugged into the outlet 27.

The solenoid-operating circuit is illustrated diagrammatically in Fig. 1. Here 55 denotes the shutter of the camera, 56 the operating coil of the solenoid, 57 the armature or core of the solenoid, and 58 the shutter-operating arm. This arm is connected at one end to the solenoid armature 57. 60 and 61 denote the terminals or blades of the plug which may be plugged into the outlet 27. Between the solenoid coil 56 and terminal 61 there is a variable inductor 62.

Figure 2:
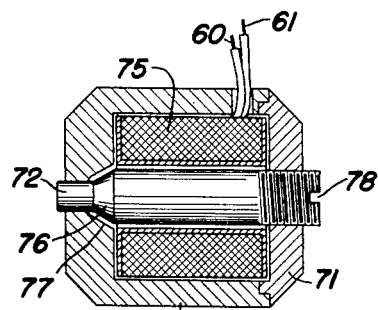
Fig. 2 is a cross section of a variable inductor constructed according to this invention for use in this system.

The variable inductor 62 permits of delaying operation of the solenoid so as to synchronize the opening of the shutter with the light peak of the flash lamp. The inductor may be of any suitable construction. It is preferred, however, to use the novel type of inductor illustrated in Fig. 2. This comprises a body 70, a cap 71, and a core 72. All these are made of materials of high permeability. The induction coil of the inductor is denoted at 75. The core 72 is adjustably threaded at one end into the cap 71 and is of reduced diameter at its opposite end. It is provided adjacent the latter end with a tapered portion 76 that connects its larger and smaller diameter sections. The body of the inductor has a correspondingly tapered recess 77 with which the tapered portion 76 is adapted to cooperate. The core is adjustable axially; and the taper permits a sensitive control on the air gap between the core 72 and the body 70 of the inductor. Thus it permits a low rate of change of permeability with respect to the axial position of the core so that the reluctance of the magnetic path can be varied within very fine, precise limits. A kerf 78 may be provided in the right hand end of the core to receive a screw driver or similar tool to permit easy adjustment of the axial position of the core. By adjusting the core axially, therefore, different reluctances can be obtained.

Figure 3:
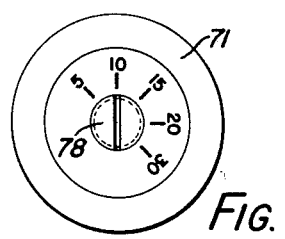
Fig. 3 is an end-view of this inductor.

The kerf 78 serves as an indicator and permits easy setting of the reluctance of the inductor. The outside face of the cap 71 may be graduated in milliseconds, for instance, as shown in Fig. 3. By turning the core 72 so that kerf 78 is opposite the graduation corresponding to the flash lamp employed, the photographer can be sure that his shutter will open at the flash peak of the lamp.

When the switches 20 and 25 are in the full line position shown in Fig. 1 and the flash light bulb is out of its socket, the system is open. When the flash light is screwed into its socket, however, a circuit is closed, permitting the battery 10 to charge the three capacitors 12, 13 and 14. One circuit from the battery is through the line 30, the outlet 27, the line 31, the capacitor 13, the line 32, the switch 25, the line 33, the resistor 16, the line 34, the contactor 26, and the line 35 back to the battery. Another circuit is from the battery through the line 31, the line 36, capacitor 12, line 37, resistor 15, line 34, contactor 26, and line 35 back to the battery. The third circuit is from the battery through the line 31, the line 38, resistor 17, line 39, capacitor 14, line 40, and line 34, contactor 26, and line 35 back to the battery. If the lines 60 and 61 are plugged into the outlet 27, the solenoid-operating circuit, above described, is also incorporated in the circuits to the several capacitors.

If the flash bulb is in place then, the capacitors 12, 13 and 14 are charged; and energy is stored in these capacitors to provide power for subsequently igniting the flash lamp and operating the shutter. The magnitude of the charging current is limited by the internal resistance of the battery and the external resistance of the resistors 15, 16 and 17 which limit and control the charging circuits.

It is undesirable to keep the battery connected to the capacitors at all times since there is a small amount of leakage current present which will reduce the battery life. With the present circuit, however, there is no difficulty on this score. When the photoflash lamp is out of circuit, no voltage exists across the capacitors. When the lamp is inserted, though, the charging current brings the capacitor voltage up to the battery voltage in a few seconds. After the filament of the lamp has been burned out, the charging voltage is again removed from the capacitors since the circuit is opened by the burning out of the lamp.

The bulb 24 is a small incandescent bulb. The switch 25 is a single pole, double-throw manually-operated switch. In the normal position of the switch 25 shown in full lines, the capacitors 12, 13 and 14 are charged if the flash bulb is in place, and if the outlet 27 is shorted, or the solenoid lines 60 and 61 are plugged into the outlet.

The lamp 24 permits of determining whether the main operating circuits for the flash lamp and for the shutter-operating solenoid are in order and whether the capacitors 12 and 14 are charged sufficiently to ignite the flash lamp and operate the shutter solenoid, for upon movement of the switch 25 to the dotted line position 25', the capacitor 13, if charged, will discharge through the bulb 24 causing it to blink. When the switch 25 is moved to the dotted line position shown at 25', a circuit is made from capacitor 13 through line 31, line 45, lamp 24, line 46, switch 25 and line 32 back to the capacitor 13. Hence, on closure of the switch 25 a signal is given indicating whether or not all of the components of the previously described circuits, comprising the flash lamp, battery, capacitors, and resistors are in working order. This is because the capacitors are in parallel; and because, therefore, capacitor 13 cannot be charged without the capacitors 12 and 14 being charged also. Hence, if capacitor 13 has a charge sufficient to blink the bulb 24, then the other capacitors 12 and 14 will have sufficient charges to perform their functions. All of these elements are in series except the capacitors which are in parallel. The capacitor 13 discharges to blink bulb 24 without the other capacitors 12 and 14 being discharged because of the action of resistors 15 and 17. Reopening of the switch 25 to its full line position recharges capacitor 13.

When the blink of the light bulb 24 shows that everything is in order, and the switch 25 is back in its full line position, the system is ready for use. Closure of the double arm switch 21—22 then causes the charges from the capacitors 14 and 12 to ignite the flash lamp and to energize the shutter-operating solenoid if lines 60 and 61 are plugged in. The circuit from capacitor 14 is through line 40, line 34, contactor 28, lines 35 and 50, now-closed switch arm 21, line 51 and line 39 back to the capacitor 14. The circuit to the solenoid 56 is from the capacitor 12 through the line 37, the line 64, the now-closed switch arm 22, the line 65, the line 30, line 60, solenoid 56, inductor 62, line 61, line 31, line 36, back to the capacitor 12. Thus the solenoid 56 may be energized under control of inductor 62 simultaneously with the ignition of the flash lamp and in such wise that the shutter may be open at the peak of the flash. The inductor controls the current build-up rate through the circuit so that the solenoid trips several milliseconds after the ignition of the flash bulb, and therefore proper synchronization can be obtained. The inductance of the inductor can be varied by axial adjustment of core 72 to accommodate different flash lamps having different delay times from ignition to peak light output. The whole delay scheme works on the principle of controlling current build-up in a transient electrical discharge.

Figure 4:
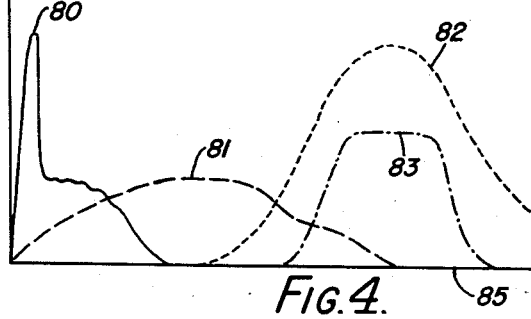
Fig. 4 is a diagram illustrating the performance of the circuit of Fig. 1.

The operation of the system of the present invention is illustrated diagrammatically in Fig. 4. Here, 80 is a curve denoting the lamp current; 81 is a curve denoting the solenoid current; 82 is a curve denoting the light output; and 83 is a curve denoting the shutter opening. By use of a variable inductor 62 the shutter opening can be timed to occur at the peak of the light output. The base 85 of the diagram denotes milliseconds.

Additional flash lamp outlets of the self-shorting type may be placed between the socket 11 and the line 50 along the line 35 so that a plurality of flash lamps can be ignited simultaneously if desired.

In the normal battery-capacitor flash systems, leakage losses through the flash bulb condenser are prevented by removing the bulb, but if the solenoid is left connected, losses on the order of 100 microamperes occur through the solenoid capacitors. The circuit of the present invention prevents any loss as long as the flash bulb is either removed from the circuit or burned out.

If the flash light system is being used on a camera which is equipped with a flash synchronizing shutter, then the lines 60 and 61 are disconnected from self-shorting outlet 27 and the leads from the flash-synchronizing shutter are plugged into the circuit to bridge a connection between the lines 53 and 54 which supply current to the shutter synchronizing mechanism of the camera.

The present system lends itself to embodiment in an attractive size and with reduced weight as compared with conventional low voltage flash light systems. The successful operation of this system does not depend upon battery current. Insertion of the flash lamp or lamps closes the capacitor-charging circuits and all three capacitors soon assume a potential very nearly equal to the battery voltage. The resistors limit the charging current to a value well below that required to flash a lamp. Closure of the double poled switch 20 discharges the capacitors through the flash lamp causing it to ignite.

The effect of temperature on capacitors is not as severe as it is on dry batteries. Hence the system of the invention is more reliable in operation. With the present system, moreover, a plurality of flash lamps may be connected in series. This insures synchronization within the limits of lamp tolerance. With previous systems, the lamps have had to be connected in parallel which means that frequently the lamp nearest the power supply fire sooner than those more remotely located from the power supply.

The present system has the advantage of simplicity, light weight, since a small battery may be employed, small size, for this same reason, and economy.

The system is versatile, reliable; it is usable over a wide range of temperatures. It is economical; there is no battery leakage; and a simple inexpensive delay mechanism can be used to insure proper synchronization of the shutter opening. Moreover, this delay mechanism can readily be adjusted to suit the peak of the flash lamp used. Heretofore when the photographer changed the type of flash lamp being used, he had to make a test to be sure that his shutter solenoid would open the shutter at the light peak of the lamp. With the present mechanism different delays in shutter opening can be obtained simply by rotary adjustment of the core 72 of the inductor.

The small incandescent lamp 24 alerts the photographer to the fact that his circuits, including lamp and solenoid, are complete and completely charged, so that he knows that, when he actuates the firing switch proper, shutter action and flash synchronization will occur when exposure is actually attempted. Moreover, with the present system, if solenoid 56 is being used, not only must the flash lamp be in place but both lamp and solenoid must be in order; otherwise the system will not function and the capacitor which actuates the signal lamp 24 will not be charged. The signal lamp tests, therefore, the completeness of the solenoid circuit, when used, as well as the flash lamp circuit. This indicating device does not adversely affect the life of the batteries or the recharging time between exposures. It takes but a few seconds after one exposure has been made for the capacitors to recharge themselves; no more time than is required for focusing and preparing for the next picture. Hence with the present system the photographer is assured at all times of sufficient power to operate his flash lamps and his shutter.

While the invention has been described in connection with a particular embodiment thereof, it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. Photoflash apparatus comprising a source of electric power, a capacitor, a resistor, and terminals for a flashlamp, all connected in series, a second capacitor and a second resistor arranged in series with one another and with the terminals of said flash lamp and said source of electric power but connected in parallel to the first capacitor and first resistor, an electrically operable signal device, a switch movable to establish a discharging circuit between the first named capacitor and said signal device to operate the same, and a second switch movable to establish a discharging circuit between the second named capacitor and the flashlamp terminals.

2. Photoflash apparatus comprising a battery, and two capacitors, two resistors, and terminals for a flashlamp connectable with said battery, each of said resistors being connected in series with one of said capacitors, said capacitors being connected in parallel, and each resistor, associated capacitor, and battery being in series with said terminals, an electrically operable signal device, a switch movable to disconnect one capacitor from said battery and said terminals and to establish a discharging circuit between said one capacitor and said signal device to actuate the same, and a switch movable to establish a discharging circuit between the other capacitor and the flash lamp terminals while said battery and the resistor which is associated with said other capacitor remain connected to said terminals.

3. Photoflash apparatus for synchronizing operation of the shutter mechanism of a camera with the flash of a flash lamp, comprising a solenoid for operating the shutter, a variable inductor, a resistor, a capacitor, and terminals for the flash lamp, all connected in series and connectable in series with a source of electrical power, a second capacitor and a second resistor connected in parallel with the first capacitor, a switch for establishing a discharging circuit between one capacitor and the solenoid and the variable inductor, and a switch for simultaneously establishing a discharging circuit between the other capacitor and the terminals of the flash lamp.

4. Photoflash apparatus for synchronizing operation of the shutter mechanism of a camera with the flash of a flashlamp, comprising a solenoid for operating the shutter, a variable inductor, a resistor, a capacitor, and terminals for the flashlamp all connected in series and connectable with a source of electrical power, two other capacitors and two other resistors, each of said two other resistors being in series with one of said two other capaciors, each of said two other capacitors and its series-connected resistor being connected in parallel with the first capacitor, an electrically operable signal device, a switch for establishing a discharging circuit between one capacitor and the signal device, and a second switch for establishing a discharging circuit between the terminals of the flash lamp and one of the other capacitors, and a third switch for simultaneously establishing a discharging circuit between the solenoid and variable inductor.

5. Photoflash apparatus for synchronizing operation of the shutter mechanism of a camera with the flash of a flash lamp, comprising a self-shorting outlet, a capacitor, a resistor, and terminals for the flash lamp, all connected in series and connectable to a source of electrical power, a second resistor and a second capacitor connected in series with one another but connected in parallel with the first resistor and first capacitor, a third resistor and a third capacitor connected in series with one another but connected in parallel with the first resistor and first capacitor, an electrically operable signal device, a solenoid and an electrical time-delay device connectable to the circuit at said outlet, a switch for establishing a discharging circuit between one capacitor and the signal device, a second switch for establishing a second discharging circuit between the third capacitor and the terminals of the flash lamp, a third switch for establishing a third discharging circuit between said outlet and the third capacitor, and a second outlet connected in parallel with said second switch, said second outlet being normally open but being connectable with flash-synchronizing mechanism of a camera shutter when said outlet is shorted and said solenoid and said time-delay device are not connected thereto.

6. Photoflash apparatus for synchronizing operation of the shutter mechanism of a camera with the flash of a flash lamp, comprising a self-shorting outlet, a capacitor, a resistor, a battery, and terminals for the flash lamp, all connected in series, a second resistor and a second capacitor connected in series with one another and with said battery and said terminals but connected in parallel with the first resistor and first capacitor, a third resistor and a third capacitor connected in series with one another and with said battery and said terminals but connected in parallel with the other two resistors and capacitors, an electrically operable signal device, a solenoid and an adjustable electrical time-delay device connectable in series circuit at said outlet, a switch for establishing a discharging circuit between the second capacitor and the signal device, a second switch for establishing a discharging circuit between the third capacitor and said terminals, and a third switch for establishing a discharging circuit between said solenoid, said time-delay device and said first capacitor through said outlet.

FREDERICK F. TONE.

References Cited in the file of this patent

UNITED STATES PATENTS

| Number | Name | Date |
| --- | --- | --- |
| 1,699,506 | Faus | Jan. 15, 1929 |
| 2,005,203 | Polydoroff | June 18, 1935 |
| 2,324,075 | Gillon et al. | July 13, 1943 |
| 2,358,796 | Edgerton | Sept. 26, 1944 |
| 2,395,600 | Weisglass | Feb. 26, 1946 |
| 2,432,084 | Blair | Dec. 9, 1947 |
| 2,546,734 | Farber | Mar. 27, 1951 |